United States Patent

Broadway et al.

[15] 3,673,477

[45] June 27, 1972

[54] POLE-CHANGING, THREE-PHASE ALTERNATING CURRENT INDUCTION MOTOR, WITH SINGLE-LAYER STATOR WINDING

[72] Inventors: Alexander Richard William Broadway; William Fong; Gordon Hindle Rawcliffe, all of Bristol, England

[73] Assignee: National Research Development Corporation, London, England

[22] Filed: Feb. 9, 1970

[21] Appl. No.: 9,546

[30] Foreign Application Priority Data

Feb. 18, 1969 Great Britain..................8,791/69

[52] U.S. Cl..........................318/224 R, 318/225 R, 310/202
[51] Int. Cl. ......................................................H02p 7/48
[58] Field of Search................318/224 R, 225 R; 310/198, 310/202

[56] References Cited

UNITED STATES PATENTS

| | | | |
|---|---|---|---|
| 2,820,938 | 1/1958 | Davies | 318/224 R |
| 3,463,988 | 8/1969 | Canadelli | 318/224 R |
| 3,233,157 | 2/1966 | Rawcliffe | 318/224 R |
| 3,299,337 | 1/1967 | Rawcliffe et al. | 318/224 R |
| 3,308,363 | 3/1967 | Rawcliffe et al. | 318/224 R |

*Primary Examiner*—Gene Z. Rubinson
*Attorney*—Larson, Taylor and Hinds

[57] ABSTRACT

A three-phase, two-speed pole-changing induction motor, using the pole-changing method of pole-amplitude modulation, which has a single-layer stator winding, diamond or concentric coils being used as preferred. The stator coil layout is derived from the stator coil layout of a corresponding double-layer winding for the same alternative pole-numbers.

The present invention provides a two-speed, three-phase alternating current electric motor having a single layer stator winding with alternative connections providing alternative pole-numbers by a modified method of pole-amplitude modulation.

3 Claims, 12 Drawing Figures

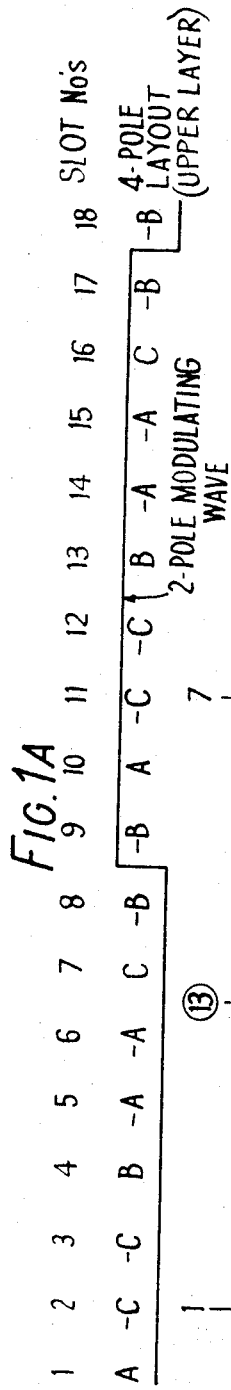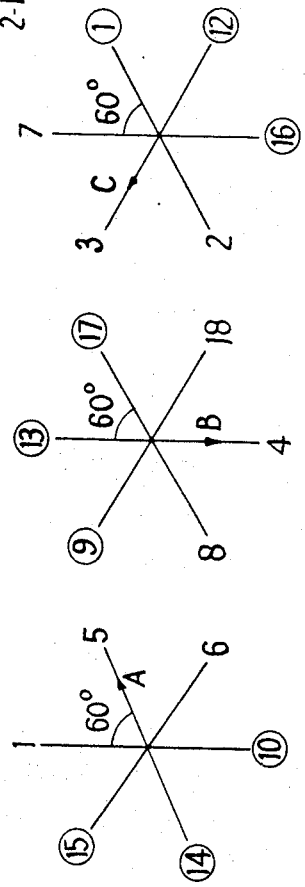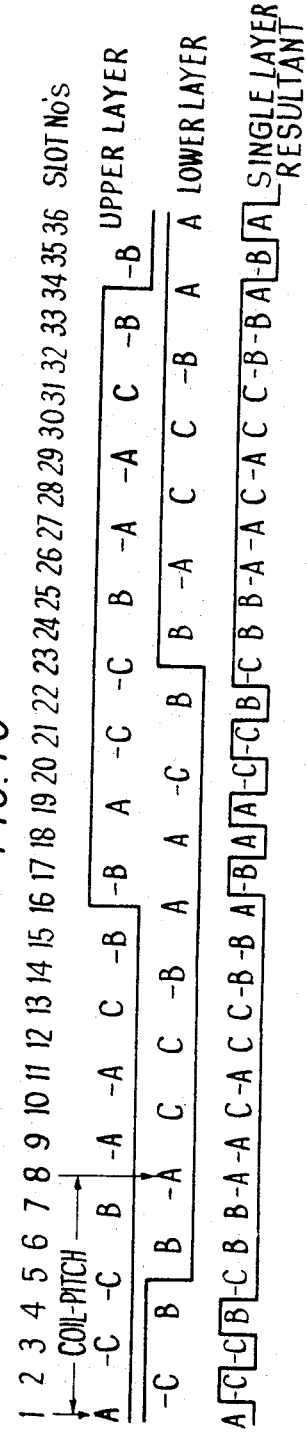

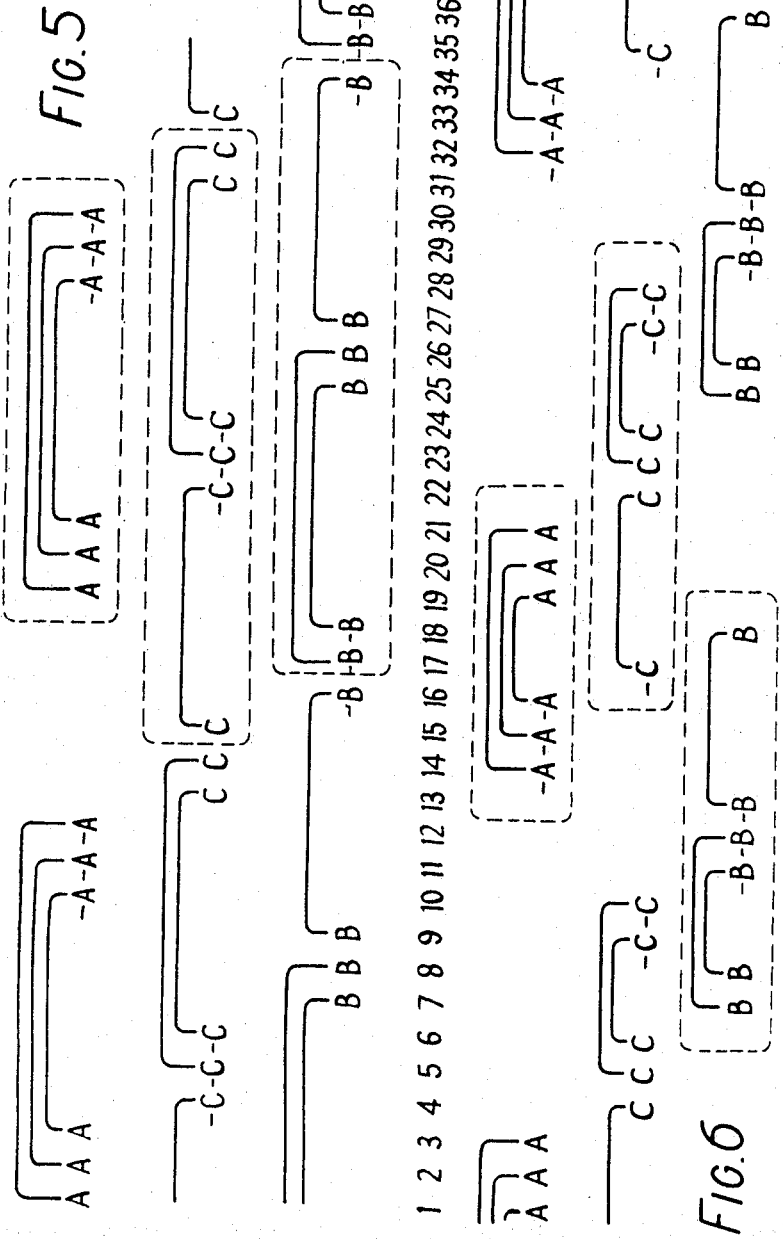

SLOT NO'S: 1 2 3 4 5 6 7 8 9 10 11 12 13 14 15 16 17 18

COIL PITCH

UPPER LAYER
8-POLE LAYOUT
LOWER LAYER

END-CONNECTIONS
PHASE A.

POLE-CHANGING, THREE-PHASE ALTERNATING CURRENT INDUCTION MOTOR, WITH SINGLE-LAYER STATOR WINDING

This invention relates to rotary electric machines, particularly to two-speed, three-phase, alternating current motors.

The method of pole-changing by pole-amplitude modulation (P.A.M.) is now well-known in relation to double-layer three-phase windings. A number of patent specifications and technical articles explain the method, and describe various techniques which have been developed for its practical application.

Manufacturers of small induction motors may prefer the single-layer type of winding on economic grounds. This type of winding has fewer coils, fewer end-winding connections and may be wound more readily by automatic machines than the double-layer windings.

The object of the present invention is the application of P.A.M. to single-layer windings for three-phase induction motors.

Accordingly, the present invention provides a two-speed, three-phase, alternating current motor having a single-layer stator winding having alternative connections corresponding to the reversal in current-carrying sense of selected portions thereof and corresponding to pole-amplitude modulation of the winding to provide one or the other of alternative running pole-numbers.

In order that the invention may be more fully understood and readily carried into practice, a number of practical embodiments will now be described in detail, by way of example, with reference to the accompanying drawings, in which:

FIG. 1A shows the phase band layout of the upper layer of a four-pole/six-pole double-layer winding in 18 slots;

FIG. 1B shows the slot vectors for each of the three phases for the winding of FIG. 1A;

FIG. 1C shows the arrangement of the coil sides of the double-layer winding of FIG. 1A as a single-layer winding in 36 slots;

FIG. 5 shows the single-layer concentric four-pole/six-pole winding in 36 slots corresponding to the double-layer winding of FIG. 3;

FIG. 6 shows the single-layer concentric six-pole/eight-pole winding in 36 slots corresponding to the double-layer winding of FIG. 4;

Figure 2:
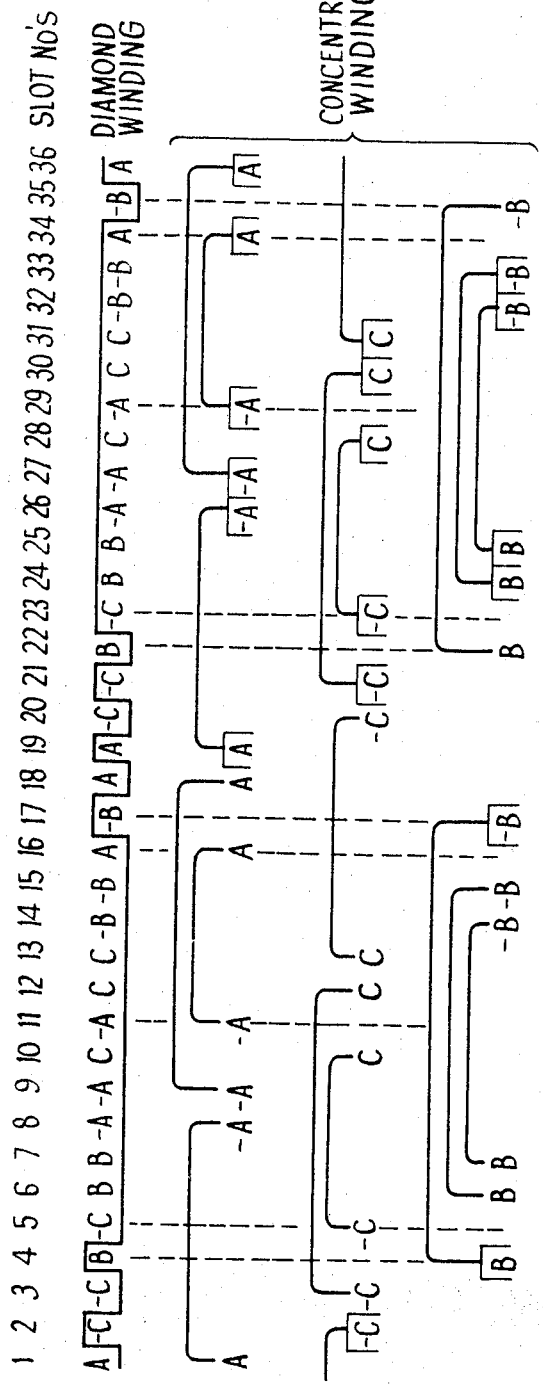
FIG. 2 shows the derivation of a concentric winding from the four-pole/six-pole single-layer diamond winding in 36 slots shown in FIG. 1C.

Single-layer windings, particularly in concentric form, have recently regained some degree of favour for standard single-speed induction motors, both single-phase and three-phase. They are thought by some manufacturers to be more economical of labor than double-layer windings. Further, they can often be wound by an automatic machine.

It is therefore considered desirable to disclose single-layer windings for three-phase P.A.M. motors, so that when single-layer windings are preferred, they can be used as an alternative to certain of the double-layer windings previously disclosed.

As far as labor costs are concerned, the same arguments apply to P.A.M. motors as to single-speed motors. On the other hand, there is a commonly some worsening of the m.m.f. waveform where a single-layer P.A.M. winding is used, instead of a double-layer P.A.M. winding. The effect of chording a double-layer P.A.M. winding is almost always to reduce the proportionate value of residual parasitic harmonics; but single-speed motors, on the contrary, are only affected in the second-order by chording.

For P.A.M. motors of large horsepower, when only one or two are to be supplied, the expense of building a prototype for each new design is quite unacceptable. Consequently, it is necessary to minimize the risk of trouble by designing production machines for minimum harmonic content; and double-layer windings will normally be used for large P.A.M. motors, quite apart from their manufacturing convenience, in order to be on the safe side, in relation to parasitic harmonics.

In fact, many single-layer P.A.M. windings, particularly those for limited numbers of slots (for example, 36 slots) are perfectly satisfactory, despite the existence of quite substantial harmonics for one (or both) speeds. It is especially desirable to test each single-layer design by building a prototype, but this requirement is not of any consequence when dealing with small motors for mass production.

Further, some slight deterioration in performance (starting torque, power factor or efficiency) is usually acceptable in very small motors, provided the design is simple and cheap to manufacture.

The first basic way of designing a single-layer P.A.M. winding, using either diamond or concentric coils, is first to design a double-layer P.A.M. winding for the same pole-ratio, but for half the number of stator slots required for the single-layer winding. This double-layer winding is then considered as being constructed with the 'go' sides of each successive coil in alternate, say, odd-numbered, stator slots of the single-layer stator, the 'return' sides being placed in the intermediate, that is, even-numbered, slots.

This arrangement permits a degree of chording to be used, but the coil-pitch must clearly be equal to an odd number of slots, relative to the single-layer slot-number. This may not be the ideal coil-pitch for the elimination of harmonics; and the resultant m.m.f. of such a winding is usually slightly worse than a double-layer winding in the same number of slots.

None the less, and in spite of difficulties, good single-layer P.A.M. windings can be designed by this method. In FIG. 1 of U.S. Pat. No. 988,726 there is shown a four-pole/six-pole, three-phase, double-layer P.A.M. winding in 36 slots, designed by the slot-vector star method.

Using an exactly similar method, a four-pole/six-pole double-layer P.A.M. winding in 18 slots can be obtained in the way as is shown in FIG. 1A of the accompanying drawings.

FIG. 1B shows the slot-vector diagrams for each of the three phases for the four-pole winding of FIG. 1A on a six-pole basis, the slot angle for 6 poles in 18 slots being 60°. The phase sequence is A B C for both four-poles and six-poles. In FIG. 1B the coils marked with a circle round the slot number are reversed to give a balanced six-pole winding.

This 18-slot double-layer P.A.M. winding can readily be turned into a 36-slot single-layer P.A.M. winding, with a coil-pitch of five slots or seven slots (theoretically, any odd number of slots) but not of 6 slots. In FIG. 1C a pitch of seven slots has been used. The coil-grouping for the original four-pole three-phase 18-slot double-layer winding was 1–2–1–2 per phase; and the modulating wave for one layer was obtained by the slot-vector star method, as was described in U.S. Pat. No. 988,726, mentioned above. The modulating wave for the resultant 36-slot single-layer winding is obtained by combining the modulating waves of the two layers of the 18-slot winding. The lay-out of the original winding, the deduction of the modulating wave and the combination of the two layers to give a single-layer winding will all be made clear by inspection of FIGS. 1A, 1B and 1C.

If diamond coils are to be retained, the single-layer design of FIG. 1C is sufficient. It only remains to connect up the coils of each phase in the usual way, so that the coils to be reversed form one-half of each phase-winding, and the coils which are not to be reversed form the other half.

However, where, for each phase of a single-layer winding, there are equal numbers of 'positive' and 'negative' coil-sides in each half of the phase winding, it is possible to reconnect the conductors to form a concentric winding. This is always possible for single-layer P.A.M. windings which are derived in the manner described above, though not always for those derived in the way described below.

In FIG. 2 it is shown how the diamond winding shown in FIG. 1C can be rearranged to give a concentric winding. The top of the diagram shows both the conductor layout, and the modulating wave to convert the winding from four poles to six poles. This layout is separated, in the figure, into individual phases; and the conductors which have to be reversed to change to six poles are marked with a symbol over them. It is then fairly easy to see how to reconnect the conductors in concentric form, it being a necessary requirement that the two conductors which are to form each coil shall be of opposite sign, and that either both or neither of them shall bear the reversal symbol.

Figure 8:
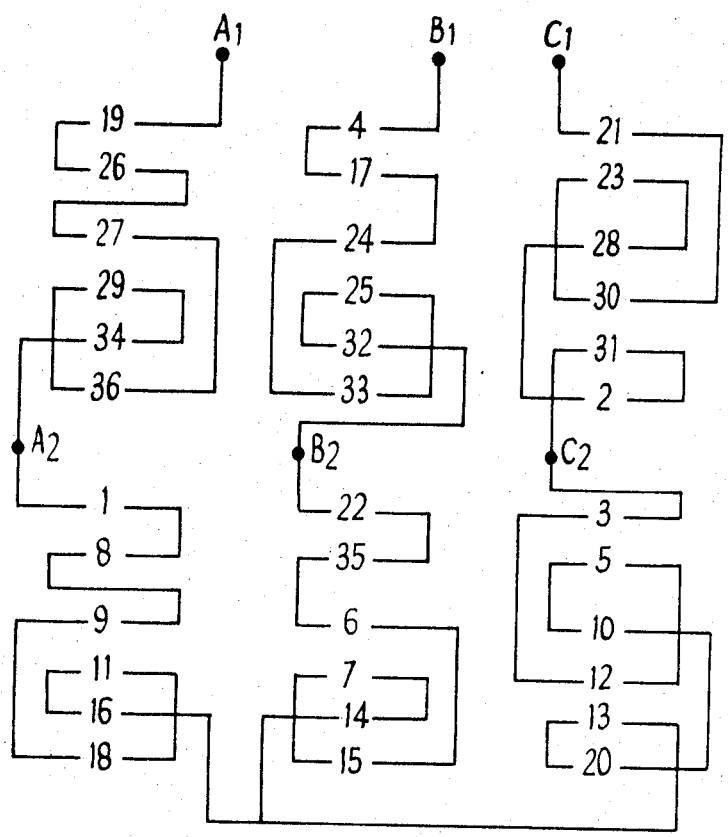
FIG. 8 is the winding diagram of the four-pole/six-pole concentric winding of FIG. 2.

FIG. 2 shows all the essential data for drawing up final workshop winding diagrams for one type of four-pole/six-pole three-phase single-layer concentric P.A.M. winding in 36 slots, and the corresponding winding diagram is shown as FIG. 8.

Figure 7:
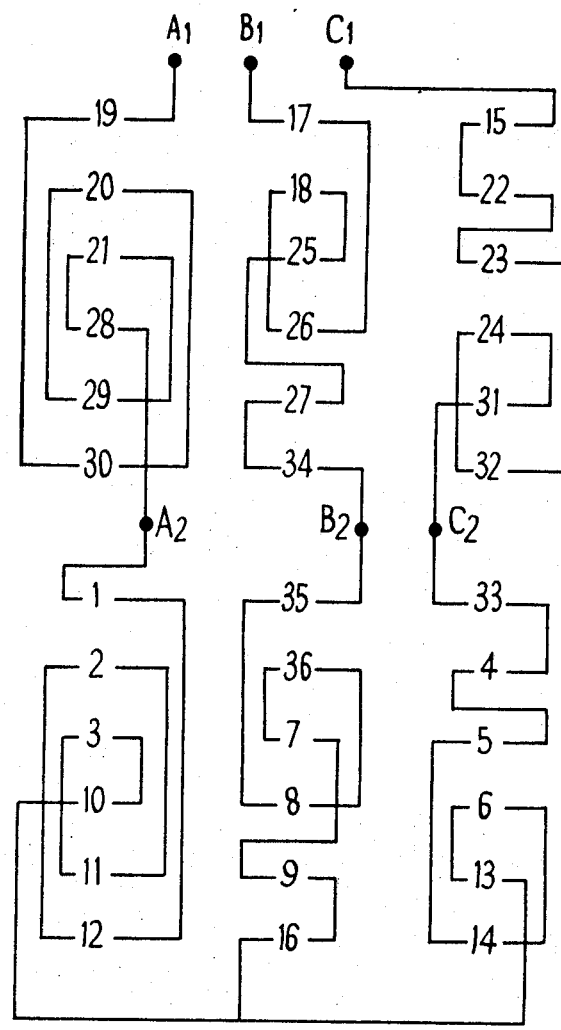
FIG. 7 is the winding diagram of the four-pole/six-pole concentric winding of FIG. 5.

This winding diagram can be compared with the comparable diagram given in FIG. 7 for another type of four-pole/six-pole three-phase single-layer concentric winding in 36 slots.

When reconnecting a single-layer diamond winding into concentric form, a further possibility arises in relation to the modulating wave. In designing the winding of FIG. 1C, the modulating wave for the complete 36-slot single-layer winding was derived by combining the separate waves for the original two layers of 18 slots each, from which the winding was derived.

If the coil-pitch is appreciably different from full-pitch for six poles, the six-pole winding factor will be thereby reduced. It is possible to improve this by applying the slot-vector technique to the 36-slot single-layer winding, using slot-vectors at 30°, and not at 60° as for 18 slots. The fact that the winding is to be reconnected in concentric form makes it possible to suppose that each conductor can be treated independently of every other one, and that they are not permanently connected in pairs, as would be the case if the diamond type of winding were retained.

In the case of the winding considered in FIG. 1C and FIG. 2 the modulating wave derived in either of these two ways is the same, because the coil-pitch is as near to full-pitch for six poles as possible. But for another winding, discussed below, two alternative modulating waves are possible, if concentric coils can be used.

As an alternative to a coil-grouping of 1–2–1–2 per phase, for a four-pole winding in 18 slots, it is possible to use a coil-grouping of 0–3–0–3 per phase. (Such a winding could otherwise be described as a four-pole three-phase 120° spread double-layer winding in 18 slots.) This winding can also be turned into a four-pole/six-pole 36-slot single-layer P.A.M. winding, in the way described above. The coil-pitch can be five, seven or nine slots. If this winding has a coil-pitch of nine slots and is to be put into concentric form, it is possible, and desirable, to derive a better modulating wave and a higher winding factor by applying a slot-vector star, with vectors at 30°, to the 36-slot single-layer layout, irrespective of the interconnected coil-sides. It should be noted that if diamond coils are to be retained, the modulating wave originally derived by the 60° slot-vector star is the only possibility.

Which coil-grouping, and which coil-pitch, are chosen in any particular case will depend on the duty of the motor, on the characteristic desired, and on the corresponding m.m.f. waveform, as determined by computer.

A second basic way of designing single-layer concentric P.A.M. windings — but not diamond P.A.M. windings — has also been devised. This method does not involve the double-layer design for half the actual number of slots: on the contrary, the first step is to design a double-layer P.A.M. winding for the final number of slots.

Figure 3:
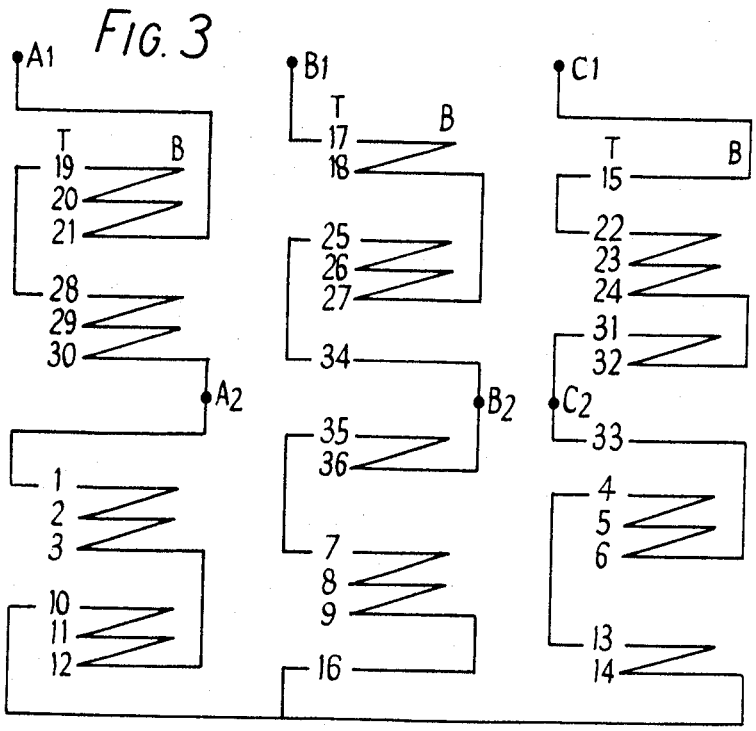
FIG. 3 is the winding diagram of a further four-pole/six-pole P.A.M. double-layer winding in 36 slots.

The double-layer P.A.M. winding diagram of the general form shown in FIG. 3 provides the full slot winding information for a winding. FIG. 3 shows the winding diagram for a four-pole/six-pole P.A.M. double-layer winding in 36 slots, which is given as FIG. 5 of U.S. Pat. No. 988,726, referred to above.

The coil pitch is six slots throughout (slot 1 to slot 7 and so on). For four-pole working, the winding parts are connected in parallel-star thus:

Supply $A_2$, $B_2$, $C_2$.

Join $A_1$, $B_1$, $C_1$. For six-pole working, the winding parts are connected in series-star thus:

Supply $A_1$, $B_1$, $C_1$.

Isolate $A_2$, $B_2$, $C_2$. With the same supply sequence, the same direction of rotation is provided for both pole-numbers.

In fact, FIG. 3 is the diagram of one layer only, the diagram of the other layer being identical in form, but displaced in space by a number of slots equal to the coil-pitch, and reversed in sign.

In many of such diagrams, the number of positive coils in each of the six half phase-windings is equal to the number of negative coils in the same half phase-windings. For example, in the four-pole/six-pole P.A.M. winding for 36 slots, shown in FIG. 3, there are three positive and three negative coils in each of the six half phase-windings. Phases B and C differ from Phase A, but the criterion of equal numbers of positive and negative coils in each half phase-winding is satisfied for all three phases.

Figure 4:
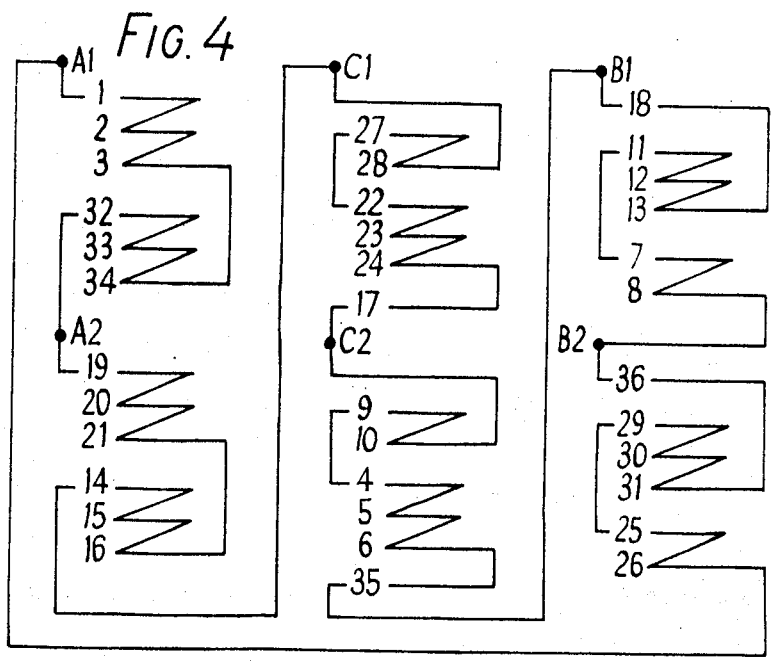
FIG. 4 is the winding diagram of a six-pole/eight-pole P.A.M. double-layer winding in 36 slots.

A similar type of P.A.M. winding diagram, but for six/eight poles in 36 slots, is given in FIG. 4.

For this winding, the coil pitch is five slots throughout (slot 1 to slot 6 and so on). For six-pole working, the winding parts are connected in parallel-star thus:

Supply $A_2$, $B_2$, $C_2$.

Join $A_1$, $B_1$, $C_1$. For eight-pole working, the winding parts are connected in series-delta thus:

Supply $A_1$, $B_1$, $C_1$.

Isolate $A_2$, $B_2$, $C_2$. With the same supply sequence, opposite directions of rotation are provided for the two pole-numbers.

Here the same criterion of equality between positive and negative coils is again satisfied.

It is not always satisfied, however, for all P.A.M. windings: for example a favored P.A.M. double-layer winding for six/four poles is grouped (+1−4+1) in one half of phase-winding A, and (−1+4−1) in the other half. The criterion is, however, satisfied for very many P.A.M. windings; and the new design method has considerable generality.

For such windings as meet the criterion above, a single-layer winding, in the same number of slots, can be derived from the 'double-layer' winding diagram, simply by laying out the conductors of one layer (only), and allotting the proper signs and reversal symbols, as appropriate, to these. The method has already been illustrated in FIG. 2. Simple inspection will show how to connect up these conductors to form a single-layer concentric winding. The process of selecting the form of the concentric end-connections for a single layer four-pole/six-pole winding derived from FIG. 3, is given by FIG. 5; and this process for a single-layer six-pole/eight-pole winding derived from FIG. 4 is given by FIG. 6.

In FIG. 5 the four-pole layout is shown, the winding parts being connected in parallel-star. For six-pole working, using series-star connection, the coil groups shown enclosed in the broken line boxes are reversed.

FIG. 6 shows the eight-pole layout, the winding parts being connected in series-delta. For six-pole working, using parallel-star connection, the coil groups shown enclosed in the broken line boxes are reversed.

In FIG. 7 is shown a four-pole/six-pole single-layer concentric P.A.M. winding diagram in 36 slots, which has been derived in this manner from the four-pole/six-pole P.A.M. winding given in FIG. 3, which was designed as a double-layer winding by the slot-star method, using two-pole total modulation.

For four-pole working the winding parts are connected in parallel-star thus:

Supply $A_2, B_2, C_2$
Join $A_1, B_1, C_1$

For six-pole working the winding parts are connected in series-star thus:

Supply $A_1, B_1, C_1$
Isolate $A_2, B_2, C_2$

A motor built to this single-layer concentric design has been tested, and found to be very satisfactory; as also has the motor described above and for which the winding diagram is given in FIG. 8.

For four-pole working the winding parts are connected in parallel-star thus:

Supply $A_2, B_2, C_2$
Join $A_1, B_1, C_1$

For six-pole working the winding parts are connected in series-star thus:

Supply $A_1, B_1, C_1$
Isolate $A_2, B_2, C_2$

Figure 9:
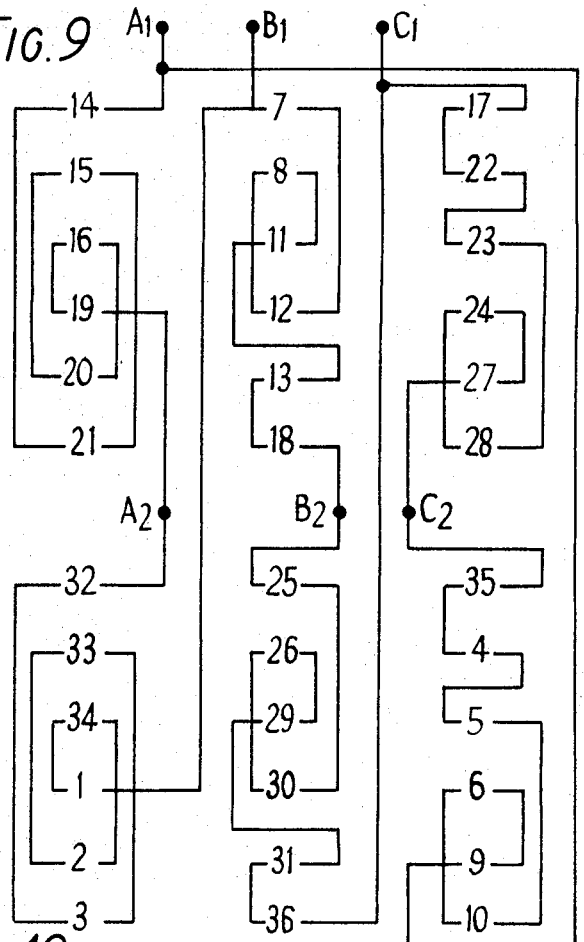
FIG. 9 is the winding diagram of the six-pole/eight-pole concentric winding of FIG. 6.

Similarly, in FIG. 9 is shown a six-pole/eight-pole single-layer concentric P.A.M. winding diagram derived in the same way from a double-layer six-pole/eight-pole P.A.M. winding in 36 slots, designed by the method of symmetrization, using 14-pole modulation, and given in FIG. 4.

In the winding of FIG. 9, for six-pole working the winding parts are connected in parallel-star thus:

Supply $A_2, B_2, C_2$
Join $A_1, B_1, C_1$

For eight-pole working the winding parts are connected in series-delta thus:

Supply $A_1, B_1, C_1$
Isolate $A_2, B_2, C_2$

This whole process yields a winding which inherently has a slightly higher winding factor than the corresponding double-layer P.A.M. winding, because the winding factor for each pole-number is equal to the corresponding spread (layer) factor. There is no reduction by a chording factor, for at least one of the pole-numbers, as must occur with a double-layer winding.

In principle, however, there is a worsening of the m.m.f. waveform, because the effect of chording is always to reduce most (or some) of the m.m.f. harmonics, relative to the fundamental. None the less, the quality of the m.m.f. waveform is often sufficiently good to dispense with the advantages of chording.

This is particularly true for motors with smaller numbers of slots (e.g. 24, 30, 36, 42, 48 slots), which means for small motors: because the permeance effect of the slotting prevents or reduces the formation of the higher harmonic fluxes, even though they are nominally present in the m.m.f. waveform.

Single-layer P.A.M. windings are likely to be desired mainly for small motors; and, since this is so, the absence of the chording factor, in reducing harmonics, has its least effect in what is the likely field of use of this type of single-layer concentric P.A.M. winding. This second type of single-layer winding, with its deliberate rejection of one layer, is, in some sense, the truest form of singe-layer P.A.M. winding. The other type, though entirely satisfactory, is, in a scientific sense, a double-layer winding with the two layers interleaved. In one form or another, single-layer P.A.M. windings are likely to find increasing use. The choice of winding in any particular case will depend on duty, characteristics, and the m.m.f. waveform, as determined by computer.

Figure 10:
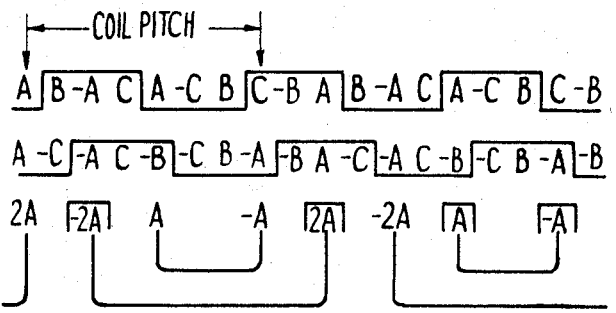
FIG. 10 shows an eight-pole/two-pole double-layer graded concentric P.A.M. winding in 18 slots.

The foregoing description has dealt with three-phase single-layer diamond and concentric P.A.M. windings. Concentric construction is sometimes advantageous, however, with two-layer P.A.M. windings because it often reduces the volume of copper required in the end-windings, particularly in wide-ratio P.A.M. motors. An example of this is given in FIG. 10.

The figure shows an eight-pole/two-pole P.A.M. winding in 18 slots, for which the coil grouping is 1—1—1—0—1—1—1—0 per phase, and the coil-pitch is seven slots. The six-pole modulating wave, for changing pole-number, is also shown.

By simple inspection, it will be seen that it is possible to re-group the end-windings of Phase A in 'graded' concentric form, the resultant being given in this figure. The complete phase-winding consists of two coils which each occupy two complete slots, and two coils which each occupy two half-slots. Since the original winding is a completely symmetrical eight-pole winding, the other two phases, B and C, will be identical, except that they will be shifted clockwise around the perimeter by 6 slots and 12 slots, with respect of Phase A. The average 'mechanical' coil-pitch of the concentric winding will be seen to be substantially less than the seven-slot pitch of the original double-layer winding; but the electrical and magnetic properties of the concentric winding will be unchanged, compared with the diamond winding, except that the resistance and leakage reactance will be much reduced.

The whole technique described here is applicable to all pole-ratios, but only for symmetrical modulation are all phases the same. For all wide-ratios, however, symmetrical or asymmetrical, there is a special advantage in the reduction of the volume, the resistance and the leakage reactance of the end-connections, when a concentric winding is used.

We claim:

1. A three-phase alternating current, two-speed, pole-amplitude modulation pole-changing, induction motor having a stator winding, with diamond coils wound in a 6N-slot stator, where N is an integer, the coil sides in odd-numbered stator slots defining phase bands in the sequence A, B, C and A, C, B, according to the sense around the stator circumference considered, the corresponding other side of each coil being located in an even-numbered slot, uniformly spaced by an odd number of slots throughout the winding.

2. A three-phase alternating current, two-speed, pole-amplitude modulation pole-changing, induction motor having a stator winding, with concentric coils wound in a 6N-slot stator, where N is an integer, the coil sides in odd-numbered stator slots defining phase bands in the sequence A, B, C and A, C, B, according to the sense around the stator circumference considered, "go" and "return" coil sides of each phase-winding being spaced apart throughout the winding by a uniform and odd number of slots, individual "go" and "return" sides of the same phase-windings and the same switched parts thereof for pole-changing being connected together to form concentric coils.

3. A three-phase alternating current, two-speed, pole-amplitude modulation pole-changing, induction motor having a stator winding, with concentric coils wound in a 6N-slot stator, where N is an integer, the coil sides in successive slots defining phase-bands in the sequence A, B, C and A, C, B, according to the sense around the stator circumference considered, individual "go" and "return" sides of the same phase-windings and the same switched parts thereof for pole-changing being connected together to form concentric coils.

* * * * *